(No Model.) 2 Sheets—Sheet 1.

R. JONES.
MACHINE FOR SIDE DRESSING TEETH OF SAWS.

No. 595,065. Patented Dec. 7, 1897.

Attest:
Jas. E. Thomas.
J. J. Plenger.

Inventor:
Richard Jones
By Geo. E. Thomas
His Atty.

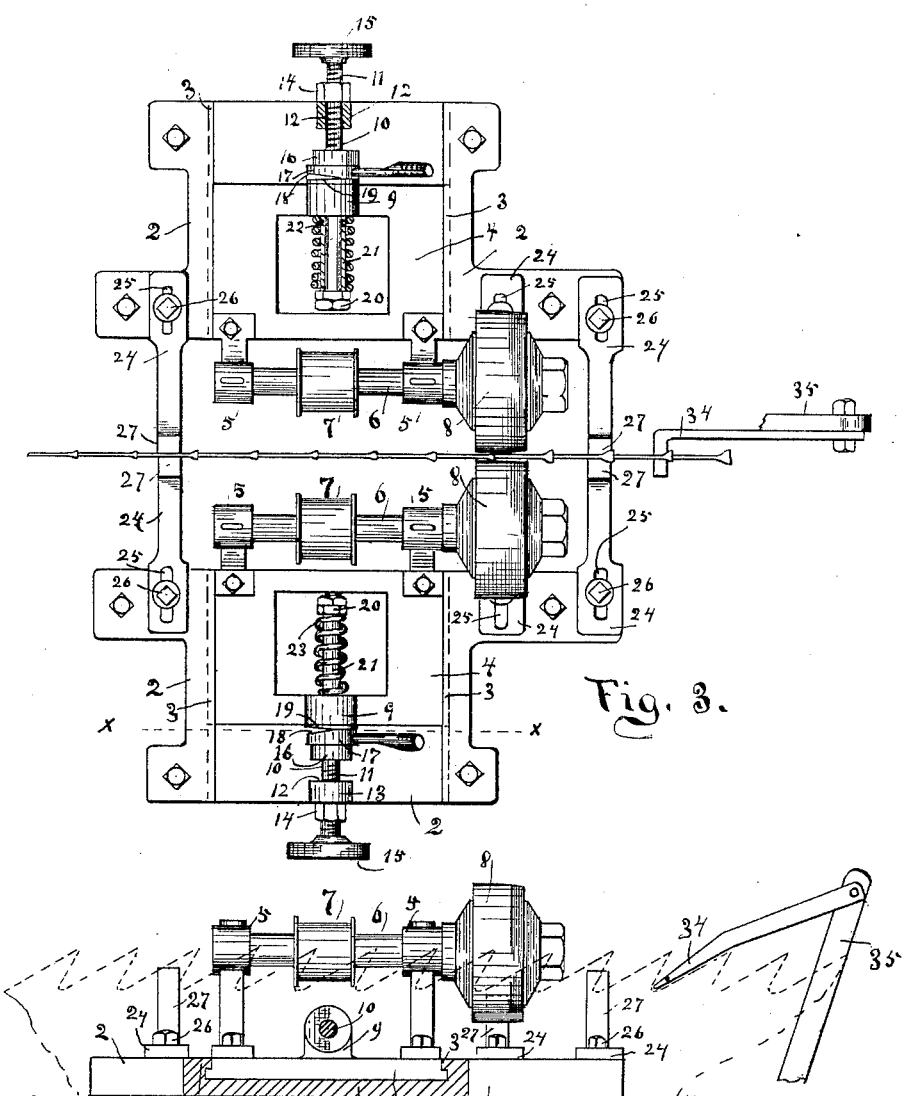

UNITED STATES PATENT OFFICE.

RICHARD JONES, OF BAY CITY, MICHIGAN.

MACHINE FOR SIDE-DRESSING TEETH OF SAWS.

SPECIFICATION forming part of Letters Patent No. 595,065, dated December 7, 1897.

Application filed January 20, 1897. Serial No. 619,839. (No model.)

*To all whom it may concern:*

Be it known that I, RICHARD JONES, a citizen of the United States, residing at Bay City, in the county of Bay and State of Michigan, have invented certain new and useful Improvements in Machines for Side-Dressing the Teeth of Saws, of which the following is a specification, reference being had therein to the accompanying drawings.

My invention relates to improvements in saw-sharpening machines, and pertains especially to that class of machines in which grinding-wheels are used for removing the extra material from the lateral sides of the points or cutting edges of the saw-tooth, and the machine is more particularly intended for use in connection with an automatic swaging-machine for dressing the side edges of the swaged points of the saw-tooth, so as to provide all of the teeth with cutting edges having the same lateral dimension; and the object of the invention is to construct and arrange a machine which will be easily manipulated to place the saw in position and to remove the same from the machine, and which can be adjusted so that when the saw is placed in position for a subsequent dressing operation the mechanism for operating on the sides of the teeth can be quickly brought accurately to the same position relative to the saw as in the previous operation.

The invention consists in the combination and arrangement of the several elements and contrivances used in the machine, together with the construction and operation of the same, as I will hereinafter explain, and which will be specifically pointed out in the claims.

My invention will be found illustrated in the accompanying drawings, in which the same figures of reference will be found indicating the same parts throughout the several views, the mechanism being shown as an independent machine.

Figure 1:
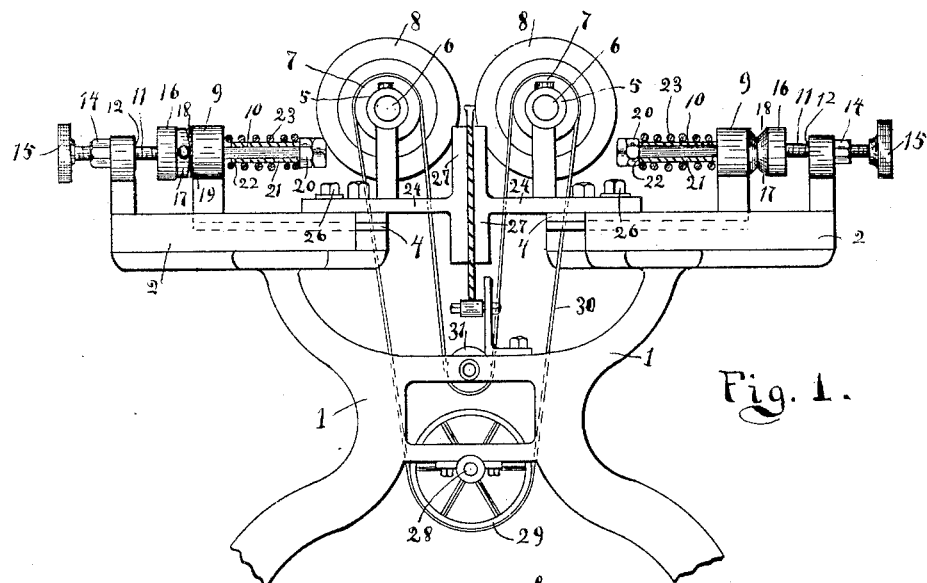
Figure 2:
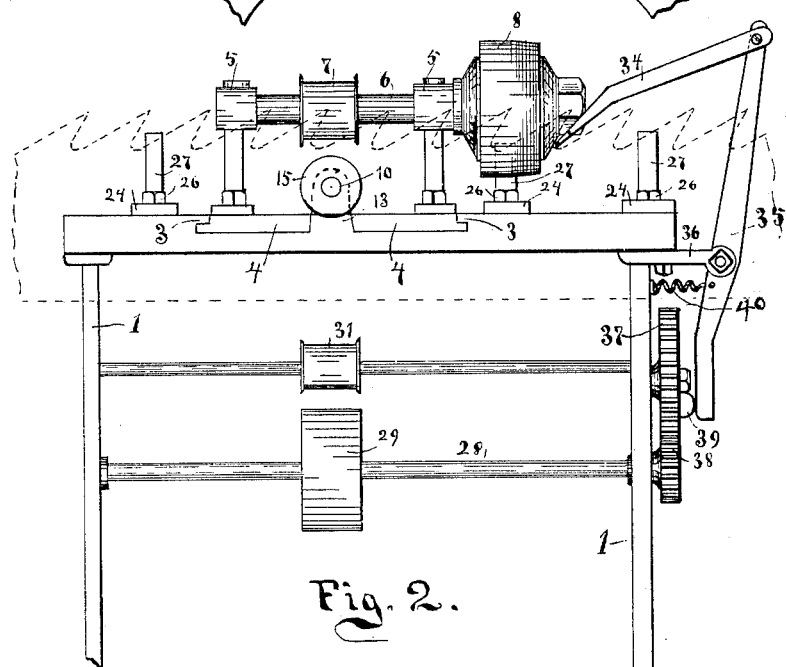

Figure 1 is an end view, partly sectional, of a saw-sharpening machine embodying my improvements. Fig. 2 is a side view of the same. Fig. 3 is a plan view of the same, partly sectional. Fig. 4 is a vertical section of Fig. 3, taken at *x x*.

1 represents the frame of the machine, and 2 are base-plates supported upon the frame and with a suitable space between for receiving the saw. These base-plates are provided with transverse slideways 3, which carry the frames 4, and these frames are provided with suitable boxes 5, in which are journaled the shafts 6, arranged parallel to the saw, and each provided with a pulley 7 for imparting revolution thereto, while upon the ends of these shafts are mounted the grinding or abrading wheels 8, which have the adjacent edges of their peripheries presented to the opposite sides of the saw-tooth. Upon the outer portions of the frame 4 are arranged the solid supports 9, through which and transversely with the shafts 6 are passed the rods 10, and these rods are provided on their outer portions beyond the supports with screw-threaded portions 11, which are passed through threaded openings 12 in the rigid supports 13, which project upwardly from the extreme outer portions of the base-plates 2. Upon the outer sides of the supports 13 the threaded rods are provided with jam-nuts 14, and on the outer ends of the rods are arranged the milled wheels 15 or other suitable device for revolving the rods, as desired. The middle portions of the rods near the supports 9 are provided with solid collars 16, and upon the portions between the collars and the supports 9 are mounted the cams 17, provided on their inner sides with the cam-faces 18, which are arranged for contact with the opposing cam-faces 19 upon the outer sides of the supports 9. The inner ends of the rods are provided with the nuts 20, and upon the portion of the rods between the nuts and the inner sides of the supports 9 is placed the sleeves 21 (or the rod may be otherwise enlarged) for forming shoulders 22 at the ends of the sleeves adjacent to the supports, and 23 are coiled springs arranged to press outwardly between the nuts 20 and the supports 9.

When the cams 17 are turned to bring the high portions of the opposing cam-faces in contact with each other, the supports 9 and the frames are actuated inwardly or toward each other, and when the parts are in this position the sleeves are of a length to allow the inner faces of the supports 9 to bear solidly against the shoulders 22 at the end of the sleeves, and the parts are then in a rigid condition in relation to each other, so that the rods 10 may then be turned into the threaded openings 12 to move the frames to the required position to bring the adjacent faces of the peripheries of the wheels 8 to the proper distance from each other for producing the exact width of the saw-tooth desired as the saw is passed between the wheels, and when the parts are thus adjusted the jam-nuts 14 are turned slightly against the supports 13, and the rods are then held solidly in this position, and the cams 17 then being turned over to bring the high portion of one face in contact with the low portion of the opposite face allows the frames 4 to recede from the saw through the action of the spring 23, the inner ends of which bear against the then rigid jam-nuts 20, while the outer ends of the springs act against the supports 9 and push outwardly on the same and move the supports away from the shoulders formed by the ends of the sleeves, which move the grinding-wheel away from the saw-tooth, as shown on the left portion of Fig. 1. This position of the parts allows the saw to be placed in position between or removed from between the abrading or grinding wheels without liability of contact with either wheel, and then when the saw is again placed in position the cams are again operated in the opposite direction, and the frames are again moved inwardly until the supports 9 come solidly against the shoulders 22, and the wheels 8 are then brought into the exact position relative to the saw as that which they occupied in the former operation, so that each successive operation upon the saw will produce teeth of the same lateral dimension without trouble or requiring the services of an expert to set the machine for each time the saw is placed in position for fitting the teeth.

24 are horizontal portions of supports, which are provided with slots 25 and secured to the bed-plates 2 by bolts 26 and extending inwardly are provided with vertical portions 27, bearing against the lateral sides of the saw for retaining the saw firmly in position against a lateral movement, but to allow the saw to be moved along between the supporting-guides, so as to pass the saw along, as desired, between the grinding-wheels.

A suitable counter-shaft 28 is journaled upon the frame 11, and power is applied from some suitable source to impart motion to this shaft, and a pulley 29 is mounted upon this shaft and a belt 30 is passed over the pulley 29 and the pulleys 7 and under an idle-pulley 31 for imparting the desired speed of revolution to the grinding-wheels.

For moving the saw through the space between the grinding-wheels intermittently a finger 34, arranged for engaging with one of the saw-teeth, is placed in front of the wheels, and the outer end of this finger is pivoted to the upper end of a vertical lever 35, which is pivoted by its central portion to a solid support 36, and the lower end of this lever is actuated outwardly by a wheel 37, which is mounted upon the frame 1 and provided with the desired speed by a gear 38 or otherwise and provided with a projecting cam 39, which as the wheel revolves moves the lower end of the lever 35 outwardly and the upper end and the finger inwardly, and a spring 40, secured to the lever and to the frame 1, operates to move the lower end of the lever inwardly and move the finger to engagement with the next tooth when the cam projection 39 has passed beyond the lower end of the lever.

It will be noticed by referring to the drawings that the diameters of the grinding-wheels on their outer sides are somewhat reduced, so as to provide slightly-beveled surfaces to their peripheries and leaving a space between the wheels somewhat greater where the saw-tooth first enters, so that the lateral portions of the swaged saw-teeth will be removed gradually until the proper dimension is obtained as the tooth passes to the rear to a position between the full portions of the peripheries of the grinding-wheels, where the tooth remains at rest for an instant while the feed-finger is on its backward movement, and this, it will be noticed, is a very great advantage, as while the tooth is in motion the rough lateral edges are removed and while the tooth is at rest the peripheries of the grinding-wheels act on the tooth to remove all roughness and thoroughly polish the lateral edges of the swaged point, so that perfect edges are produced which operate to produce a superior surface on the lumber cut thereby.

It will be understood that while I have explained the operation and action of my improved machine as working independent of other saw-fitting mechanism it is especially adapted for use in connection with an automatic saw-swaging machine or with a saw gumming or grinding machine, as the feed-movement which moves the saw forward for swaging or grinding each consecutive tooth also passes the teeth between the grinding-wheels, so that one operation then completely dresses the teeth on both front and side edges, so that the most perfect work is done and the time required for fitting up the teeth of the saw is greatly reduced.

It will also be evident that my improved receding action for the grinding-wheel is a very great advantage as to accuracy and convenience of operation, as when the cams are operated to recede the wheels the saw can be removed or replaced without stopping the revolution of the wheels, and when the cams are operated to move the wheels toward the saw the shoulders formed by the outer ends of the sleeves provides an accurate adjustment of the grinding-wheels in relation to the saw-tooth without trouble of measuring with a gage or calipers and without requiring the services of an expert saw-fitter, the entire operation of refitting the teeth being the automatic action of the machine, and it will be also understood that while I have illustrated and explained certain mechanism and devices for feeding the saw to the grinding-wheels any other means may be employed, as desired, as any feeding devices or means of operating the same can be employed, as these features are not essential to the proper working of my invention so long as suitable devices are provided for passing the saw between the grinding-wheels at the proper speed, and while I have explained certain forms of movements for advancing and receding the grinding-wheels to and from the saw independently of the mechanism for adjusting the operating location of the wheels I do not confine my claims to the exact devices herein shown and described, as many other well-known forms of cam or eccentric movements may be substituted therefor and the same result would be obtained, the most important feature of the invention being to arrange the mechanism so that the receding devices may be operated independently of the adjusting devices.

Having described the construction and operation of my improvement, what I claim as my invention is—

1. In a side-dressing machine the combination of the frame, the bed-plate mounted thereon and provided with ways arranged transversely with the saw, a frame arranged for sliding on said ways and carrying a shaft parallel with the saw, and a grinding-wheel mounted on said shaft, a rod arranged transversely with the saw for adjusting the location of said grinding-wheel in relation to the saw, and provided with a solid collar, a cam for operating against said collar for moving said grinding-wheel toward the saw independently of the adjusting-screw, and a spring for moving said grinding-wheel away from the saw, substantially as set forth.

2. In a machine for side-dressing the teeth of saws the combination of the frame having a bed-plate mounted thereon and provided with ways arranged transversely with the saw; a bracket or frame arranged to slide on the ways and carrying a shaft parallel with the saw; a grinding-wheel having a slightly-beveled grinding-surface mounted on said shaft; a rod arranged transversely with the saw, having near its outer end a thread engaging a projection in the bed-plate, for adjusting the grinding-wheel relatively to the saw; having also a fixed collar and a cam which can be rotated between the collar and a fixed cam-face on the bracket, for adjusting the bracket horizontally, said rod having at its inner end a spring for maintaining close contact between the face of the collar, the cam, and the cam-face on the bracket; all arranged for the purpose described and substantially as set forth.

3. In a side-dressing machine the combination of the bed-plate provided on its outer portion with an upwardly-projecting support having a screw-threaded transverse opening, a frame mounted for sliding on said bed-plate transversely with the saw and provided on its rear portion with an upwardly-projecting support having a transverse opening and a cam-face on its outer side around said opening, an adjusting-rod having its outer portion provided with a screw-thread and passed into said threaded opening in the support on the bed-plate and with its middle portion passed through the support on said frame and provided with a solid collar on the portion of the rod between the supports, a cam mounted on the rod between said collar and the support on the frame and provided with a cam-face engaging with said cam-face on said support, for moving said frame toward the saw, and a coiled spring upon the inner portion of said rod for actuating said frame away from the saw, substantially as set forth.

In testimony whereof I affix my signature in presence of two witnesses.

RICHARD JONES.

Witnesses:
GEO. P. THOMAS,
JAS. E. THOMAS.